United States Patent
Dujarric

(10) Patent No.: US 6,996,973 B2
(45) Date of Patent: Feb. 14, 2006

(54) METHOD OF ACHIEVING JET SEPARATION OF AN UN-SEPARATED FLOW IN A DIVERGENT NOZZLE BODY OF A ROCKET ENGINE

(75) Inventor: Christian François Michel Dujarric, Paris (FR)

(73) Assignee: Agence Spatiale Europeenne, Paris Cedex (FR)

( * ) Notice: Subject to any disclaimer, the term of this patent is extended or adjusted under 35 U.S.C. 154(b) by 0 days.

(21) Appl. No.: 10/953,447

(22) Filed: Sep. 30, 2004

(65) Prior Publication Data

US 2005/0178127 A1    Aug. 18, 2005

Related U.S. Application Data

(62) Division of application No. 09/534,196, filed on Mar. 24, 2000, now abandoned.

(30) Foreign Application Priority Data

Mar. 25, 1999 (FR) .................................. 99 03742

(51) Int. Cl.
*F02K 1/28* (2006.01)
(52) U.S. Cl. ....................... 60/204; 60/231; 239/265.17
(58) Field of Classification Search ................. 60/204, 60/231, 242; 239/265.11, 265.17, 265.23
See application file for complete search history.

(56) References Cited

U.S. PATENT DOCUMENTS

| | | |
|---|---|---|
| 3,273,801 A | 9/1966 | Wilhite |
| 3,296,799 A | 1/1967 | Fuentes |
| 3,300,978 A | 1/1967 | Pennington |
| 3,318,532 A | 5/1967 | Gaubatz |
| 3,325,103 A | 6/1967 | Abbott |
| 3,374,954 A | 3/1968 | Card |
| 3,426,972 A | 2/1969 | Osburn |
| 3,737,103 A | 6/1973 | Howell et al. |
| 3,925,982 A | 12/1975 | Mueller |
| 3,995,662 A | 12/1976 | Fitzgerald et al. |
| 4,351,479 A | 9/1982 | Kranz |
| 4,707,981 A | 11/1987 | Wagner |
| 4,754,927 A | 7/1988 | Fitzgerald |
| 5,582,000 A | 12/1996 | Rannie et al. |
| 5,638,683 A | 6/1997 | Kretschmer |

*Primary Examiner*—Michael Koczo, Jr.
(74) *Attorney, Agent, or Firm*—Sughrue Mion, PLLC

(57) ABSTRACT

The invention relates to a rocket engine nozzle comprising a system for controlling jet separation of the flow in the nozzle, wherein said control system exhibits a plurality of separation triggering elements (5, 10) arranged in such a way as to generate, from mutually spaced initiation points (9), distinct zones (6) of jet separation, so as to form a three-dimensional separation of the flow.

The flow control system can exhibit at least two triggering elements (5, 10).

7 Claims, 1 Drawing Sheet

METHOD OF ACHIEVING JET SEPARATION OF AN UN-SEPARATED FLOW IN A DIVERGENT NOZZLE BODY OF A ROCKET ENGINE

CROSS-REFERENCE TO RELATED APPLICATIONS

This is a divisional of parent application Ser. No. 09/534,196 filed Mar. 24, 2000, now abandoned the disclosure of which is incorporated herein.

BACKGROUND OF THE INVENTION

1. Field of the Invention

The subject of the present invention is a rocket engine nozzle, exhibiting a jet separation control system, for example a device for injecting fluid through a wall of the nozzle, so as to induce jet separation in the gases ejected by the nozzle.

An important point in the design of a launcher is the optimization of the performance of its engines. In particular, the nozzle must be designed so as to yield a maximum thrust coefficient compatible with the limits imposed by the other constraints.

The thrust coefficient C of a nozzle is an increasing function of the ratio of the exit area Ae of the nozzle to the area At of the throat of the nozzle.

For an upper stage, which is ignited outside the atmosphere, the static pressure of the jet at the exit of the nozzle may be very low. The area ratio $R=Ae/At$ of the nozzle is in this case essentially limited by the space available.

On the other hand, when the nozzle operates within the atmosphere, the gases which exit the nozzle cannot expand to below a limit pressure Psep, at which a separation of flow in the nozzle occurs spontaneously.

This jet separation is naturally unstable and generates considerable aerodynamic forces at the moment of ignition and during the initial atmospheric flight, which may even lead to the destruction of the nozzle if the jet separation is too considerable.

As far as engines which are designed to operate right from the ground and to accomplish the major part of their mission outside the atmosphere are concerned, the determination of the ratio Ae/At represents a difficult compromise.

Numerous devices have been proposed for controlling jet separation in nozzles.

An up-to-date review of this topic has appeared in particular in the article entitled Advanced Rocket Nozzles by Gerald Hagemann et al., published in the Journal of Propulsion and Power, vol. 14 No. 5, September–October 1998, pages 620 to 634.

2. Description of the Related Art

This deals in particular with "dual-bell" nozzles, nozzles with fixed or temporary inserts, two-position or extendible nozzles, external expansion nozzles, so-called expansion/deflection nozzles, nozzles exhibiting a variable throat area, and finally dual-mode nozzles.

The control of jet separation in a nozzle with the aid of secondary injection of gas has also been proposed, but this secondary injection has the effect of preserving axial symmetry of the flow. This technique is recalled in point 4, page 626 of the aforesaid article.

Experiments carried out on an RL10 engine and implementing passive injection are described in the article entitled "Altitude Compensating Nozzle Evaluation" by R. C. PARSLEY et al., published in the proceedings of the 28$^{th}$ Joint Propulsion Conference and Exhibit, 6 to 8 Jul. 1992, Nashville, Tenn., pages 1 to 6.

Finally, American patent U.S. Pat. No. 3,925,982 (Martin Marietta Corporation) describes a rocket engine exhibiting a high nozzle area ratio and which is equipped with a device for active secondary injection exhibiting a shock generating ring which is intended to control jet separation, by forcing the boundary layer of the primary gas jet to separate uniformly from the wall of the nozzle.

This is achieved with the aid of a large number of injection points which are distributed around the circumference of the nozzle. These injection points are closely spaced, and they inject a secondary gas jet radially and inwardly of the nozzle so as to effect jet separation which is invariant with any rotation about the axis of the nozzle.

Alternatively, this jet separation can be achieved via a continuous slot extending over the entire circumference of the nozzle.

The theory of jet separation has been recalled in the recent article by G. L. ROMINE entitled "Nozzle Flow Separation" published in the AIAA Journal, vol. 36, No. 9, September 1998, pp. 1618–1625.

The theory of secondary injection has been set out in the article entitled "Some aspects of gaseous secondary injection with application to thrust vector control" by R. D. GUHSE et al., published in proceedings No. 71–750 of the AIAA/SAE 7$^{th}$ Propulsion Joint Specialist Conference of Salt Lake City, 14–18 June 1971, pages 1 to 8.

The known techniques of secondary injection, which involve jet separation exhibiting axial symmetry, that is to say which is invariant about any rotation about the axis of the nozzle, exhibit the following problems:

active secondary injection is difficult to implement, given that the mass flux which is required for effective generation of axial symmetric jet separation is high;

passive secondary injection which implements ventilation of the nozzle is operational only within a limited range of differential pressure, which implies that in order to obtain a nozzle which operates at all altitudes, its porosity must be continuously variable as a function of external pressure and of the operational parameters of the engine, this being hardly compatible with the nozzle construction constraints.

One of the drawbacks of secondary injections with axial symmetry, such as for example that described in the aforesaid American patent, is that under certain engine operating conditions, the jet separation commences at a random point on the injection ring, and whose position, which depends on the upstream disturbances, is unstable.

SUMMARY OF THE INVENTION

An object of the invention is to propose a separation control system, especially through secondary injection which avoids such instability.

Another object of the invention is to reduce the unsteady loads applied to nozzles and hence to reduce the necessary mechanical strength of the nozzles and the engine mountings, thereby making it possible to reduce their mass.

Another object of the invention is to allow the installation on rocket engines used right from the ground, of nozzles with a higher expansion ratio and hence to enable an overall improvement in the performance of these engines.

Another object of the invention is to minimize the total secondary injection flux required to obtain stable separation.

Another object of the invention is to control the separation of the jet during ignition of the engine on the ground.

Another object of the invention is to be able to facilitate the control of jet separation as a function of altitude.

At least one of the aforesaid objects of the present invention is achieved through a rocket engine nozzle comprising a system for controlling jet separation, wherein said control system exhibits a plurality of separation triggering elements arranged in such a way as to generate, from mutually spaced initiation points, distinct zones of jet separation, so as to form a three-dimensional separation of the flow.

According to a first variant, the invention relates to an ejection nozzle for a rocket engine exhibiting a device for injecting fluid through a wall of the nozzle, so as to induce jet separation in the gases ejected by the nozzle, in which the control system is a fluid-injection device which exhibits in at least one injection cross section perpendicular to the axis of the nozzle, at least two independent injection orifices distributed over the perimeter of the wall of the nozzle, each injection orifice constituting a said separation triggering element inducing a said distinct zone of jet separation.

According to the invention, each separation triggering element, for example each injection orifice initiates and maintains locally the separation of the jet, thereby remedying the aforesaid instability. This arrangement is essentially different from that which is described in the aforesaid American patent, for which the injection orifices are tightly distributed over the perimeter of the nozzle so as to generate a flow separation which is invariant with any rotation of the axis of the nozzle, and which operates in a manner equivalent to that of a ring exhibiting a continuous slot extending over the entire circumference of the nozzle.

It is advantageous for the injection orifices, for example two in number or else three in number, to be uniformly distributed over the perimeter of the wall of the nozzle. This makes it possible to avoid to a large extent the occurrence of transverse forces applied to the nozzle.

Said injection cross section is advantageously arranged at a distance D from the throat of the nozzle which is substantially less than the distance Do of spontaneous separation of the jet.

Said nozzle cross section is preferably chosen at a level where the static pressure P of the jet is substantially greater than the natural separation pressure of the jet Psep, for example P=2 Psep.

An injection device can exhibit a plurality of injection cross sections situated at different distances from the throat, and a distributing device for feeding one or other of the injection cross sections, in such a way as to take into account, in a manner known per se, the variation as a function of altitude of the cross section where a so-called spontaneous separation of the jet occurs.

According to an embodiment making it possible to control jet separation during ignition of the engine on the ground, the flow control system exhibits an external stabilizing device integral with a ground-based installation and which exhibits, on the one hand, a number N(N≧2) of injection tubes (for example parallel to the axis of the nozzle) each of which constitutes a said separation triggering element, and which are distributed, preferably downstream of the nozzle, in such a way as to direct in counter-current to the main stream of the nozzle stabilizing fluid jets toward N impact points situated downstream of the throat of the nozzle, and on the other hand, a device for feeding the injection tubes so as to feed them with fluid for a predetermined transient duration of ignition before takeoff, with a flow rate which is sufficient for each impact point to induce a different zone of jet separation of the nozzle.

The injection tubes are preferably arranged at the outlet of the nozzle exit.

The injection points of the injector of the external stabilizing device are preferably uniformly distributed over the perimeter of the wall of the nozzle. They are advantageously two in number (diametrically opposed) or three in number (distributed at around 120° over the perimeter of the nozzle).

Other characteristics and advantages of the invention will become more apparent on reading the description which will follow, given by way of non-limiting example in conjunction with the drawings herein appended, in which:

DETAILED DESCRIPTION OF EXEMPLARY EMBODIMENTS OF THE INVENTION

Figure 1:
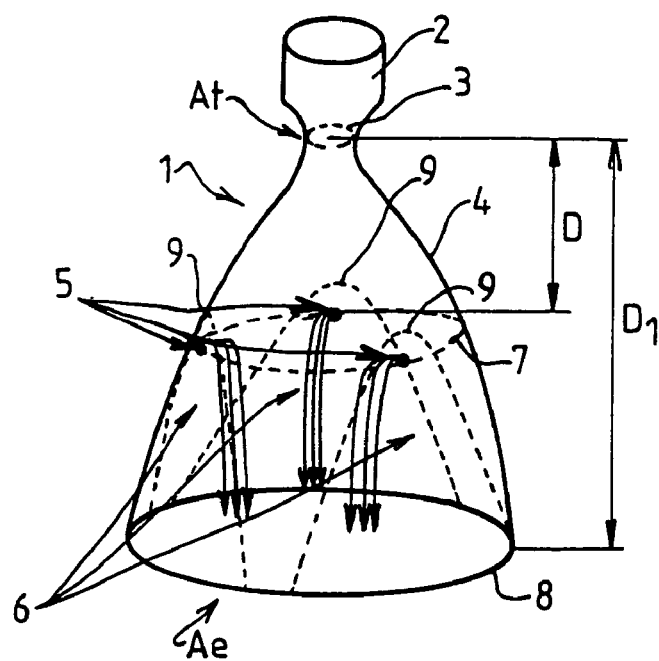
FIG. 1 represents a device for implementing the present invention.

As shown in FIG. 1, a nozzle, designated by the general label 1, exhibits a combustion chamber 2, a throat 3, and a divergent nozzle body 4 which terminates in an exit cross section 8.

Over the perimeter of the divergent portion 4 of the nozzle, and in a cross section 7 situated in a plane, perpendicular to the axis of the nozzle, where the static pressure P of the jet is substantially greater than the nozzle separation pressure Psep, are arranged injection orifices 5 able to direct radially inward a jet of a fluid, for example the combustion gases originating from the turbopumps of the engine.

The flow separation which is generated by these orifices 5, does not exhibit axial symmetry, but on the contrary it is three-dimensional. This is because each of the injection points 5, represented here as three in number and distributed uniformly at 120° around the contour of the body 4 of the nozzle, induces a region of separation 6 of the stream exiting the nozzle. Owing to the determination of a limited number of injection points 5 which induce an equal number of separation regions 6, the position of the points of initial separation is not indeterminate and this makes it possible to solve the problem of instability.

Furthermore, by reason of the uniform distribution of the injection points 5 around the circumference of the nozzle body 4 in the plane 7, the resultant of the lateral forces which are exerted on the nozzle and which, in the prior art is unstable, remains close to the axis of the nozzle.

The cross section in which the injection is carried out is chosen in such a way as to be of slightly smaller area than that of the cross section at which spontaneous stream separation would be apt to occur at low altitude.

The device described makes it possible to obtain three-dimensional separation exhibiting a plurality of separated regions 6 which may possibly remerge downstream toward the exit 8 of the nozzle.

In theory, the number of injection points 5 could be equal to just 2 so as to make it possible to maintain a symmetric thrust for the nozzle. The number of three injection points 5 seems however to be a preferable choice in order to avoid accidental separation of half the nozzle which could arise on ignition.

Moreover, a higher number than three injection points may be envisaged, but this does not afford any appreciable advantage. In any event, the number and the spacing of the injection points must be chosen in such a way as to avoid any continuity of jet separation, which would amount in fact to the operating conditions equivalent to that of a uniform ring (see the aforesaid American patent U.S. Pat. No. 3,925,982).

The manner of operation of the invention can be explained as follows:

The gases which are generated in the high-pressure combustion chamber 2 are, after passing through the throat 3, subjected to an expansion in the ejection nozzle 4 and the static pressure decreases at the same time as the jet is directed toward the exit 8 of the nozzle.

When a rocket engine operates at the static pressure which prevails at sea level, and without implementing secondary injection, as soon as the static pressure of the jet approaches the normal pressure for separation, the jet in the nozzle is apt to separate spontaneously, but such separation is unstable and occurs in a random place of a cross section of the body of the nozzle 4, possibly creating appreciable unsteady forces.

The injection orifices 5 which direct a secondary stream radially inward according to the invention create an obstacle to the main jet locally, thereby creating an arc-shaped shock wave in respect of the incident supersonic jet. This arc-shaped shock zone interacts with the boundary layer, in which it creates an increase in pressure just upstream of the injection point 5, thereby inducing local separation of the boundary layer at the points 9. Given that the boundary layer was already under conditions under which it was near to spontaneous separation, the jet of the nozzle cannot reattach itself to the wall of the body 4 and the separation of the boundary layer spreads so as to adopt for each injection point 5 a conical configuration as shown by the dashed drawing of the separation regions 6 in FIG. 1. The vertex of the cones 6 is constituted by the points 9 of initiation of jet separation. The three injection points 5 create, starting from the initiation points 9, three substantially identical cones 6 which are apt to remerge downstream so as to form an entirely separated jet at the exit 8 of the nozzle.

Given that the points of initiation 9 where the jet separations occur are imposed geometrically by the position of the three injection points 5, the symmetry of revolution is broken and the points 9 of initiation of the separation are stable over time. The shocks which are created due to the separation of the boundary layer relative to the wall of the body 4 also remain localized and the residual vibrations due to these shocks are of low amplitude, as are the residual unsteady forces.

Furthermore, the injected flux which is required for achieving separation according to the invention is in principle smaller than in the case of secondary injection with axial symmetry of the prior art. This is because such an injection of the prior art implements a large number of orifices along a circular cross section of the nozzle. The separation of the jet requires locally at each of these numerous orifices the same minimum flow rate as each of the few orifices used according to the present invention. In the present invention, separation, which is achieved only onward of the localized points of initiation 9, tends thereafter to self-propagate along the periphery of the nozzle along with the widening and merging of the cones 6.

The process according to the invention is particularly beneficial in respect of engines exhibiting a gas generator. Such an engine exhibits turbopumps which discharge hot gases at a pressure greater than atmospheric pressure. The Vulcain engine is of this type. The gases from the turbine of the Vulcain 1 engine are expelled from the engine. In the Vulcain 2 engine, pipelines are already installed for reinjecting the turbine exit gases into the divergent portion 4 with a uniform distribution along a cross section of the nozzle, so as to cool the divergent portion, but nevertheless without achieving control of jet separation.

These gases can be reinjected at a few points only into the divergent body 4 of the nozzle to achieve jet separation according to the invention.

The present invention can be adapted to the Vulcain 2 engine with minimal modifications. It is sufficient to modify the injection ring so that it exhibits for example three injection points 5 instead of a uniform distribution of injection. Furthermore, the divergent portion 4 of the nozzle, which currently exhibits for the Vulcain 2 engine an area ratio R equal to 60 for a specific impulse of 433 seconds, could be replaced with a divergent portion exhibiting an area ratio R of the order of 140. The film-based cooling function could be replaced with radiative cooling, by virtue of a carbon/carbon nozzle extension known per se.

For the Vulcain 2 engine, the value of Psep is of the order of 0.22 bar and the recommended location for siting the points of injection 5 is the cross section for which the pressure is equal to 0.4 bar. This corresponds to a Mach number of 4 and an area ratio R of around 26. The location is not very different from the current location of the injection ring. The anticipated increase in the specific impulse is of the order of 12 seconds.

With altitude, the location of the source cross section where natural jet separation occurs migrates progressively downstream as the external pressure described decreases.

Furthermore, outside the atmosphere, secondary injection exhibits no benefit, and even penalizes the performance of the engine.

A minimal procedure is to deactivate secondary injection when the rocket leaves the atmosphere. In the Vulcain 2 engine, it is sufficient to add a valve which switches from a local injection mode to a distributed mode (film-based cooling).

Another solution is to arrange different injection points 5 which are activated in succession in such a way as to optimize the operation of the nozzle at each instant. A solution of this type has already been proposed, but for injection at continuous rings by the aforesaid patent U.S. Pat. No. 3,925,982.

The ignition of the engine constitutes a tricky phase during which pressure transients are apt to exist. It is therefore desirable to minimize the considerable asymmetries of pressure which are apt to occur and which are apt to engender a high level of stress in the nozzle. The theoretically least favorable case is that for which the jet of the nozzle is momentarily entirely attached to the wall over one half of the nozzle and entirely separated over the other half thereof.

Owing to the violence of the unsteady fluctuations in the flows during start-up of a rocket engine, it is preferable, during this start-up, to use another embodiment which will be described hereinbelow.

Indeed, it is possible to solve the problem with injection of a control fluid during the very short start-up time of the engine, which is of the order of a second. The point of impact of the injected fluid is close to the throat 3 of the nozzle, for example a distance of the order of 0.1 D1 from the throat 3, D1 designating the length of the body of the nozzle 4, given that the pressure of the chamber is lower than when the engine is at full throttle.

Finally, given that the jet is not organized, the stabilizing of the system requires a massive injection of fluid.

Figure 2:
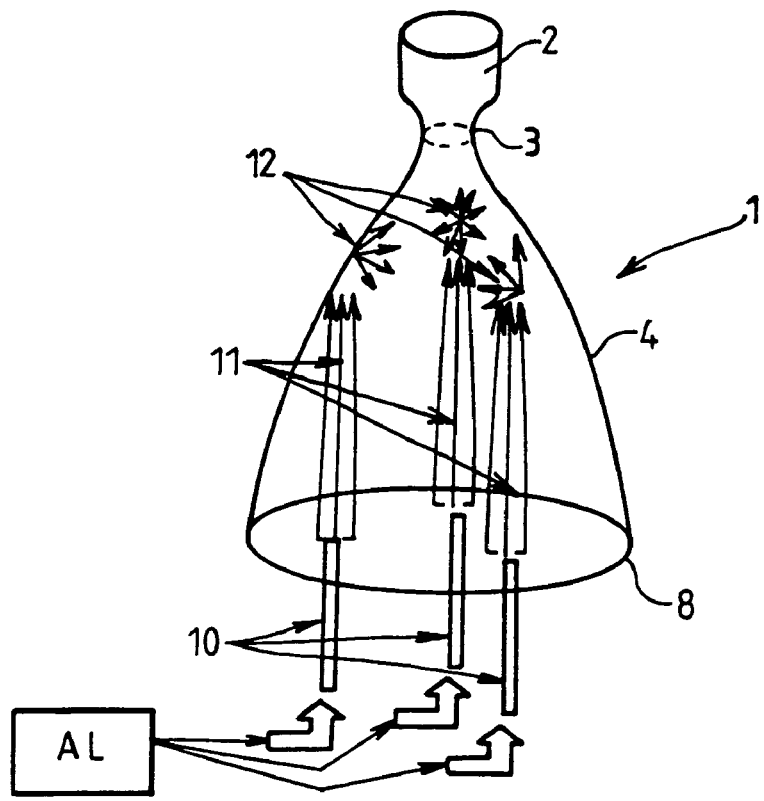
FIG. 2 represents an additional device according to the present invention which is implemented during engine start-up.

The device for stabilization on blast-off is represented in FIG. 2. It can be used independently or otherwise of the jet separation device. It implements a plurality of injection tubes 10 parallel or otherwise to the axis of the nozzle and arranged downstream of the nozzle exit 8 and directed toward impact points 12. These tubes 10 propagate fluid jets 11 in counter-current to the main stream, the points of impact 12 of these jets being situated slightly downstream of the throat 3 of the nozzle, for example a distance from the throat 3 equal to 0.1 D1. These points of impact 12 distributed uniformly at one and the same distance from the throat 3 of the nozzle produce a similar effect to that of the injection points 5, with the difference however that the fluid, for example liquid nitrogen, which is projected creates a separation at each point of impact 12 through a mass entrainment effect along the boundary layer. The points of separation of the hot gases of the jet from the nozzle are stable by reason of the existence of the impact points 12. It is advantageous to effect this injection with liquid nitrogen, since the counter-current injection rate may be very high (for example 30 kg/s for each injection point for the Vulcain 2 engine) during the short instant which proves to be necessary. Furthermore, the liquid nitrogen is transformed into gas when it encounters the hot gases originating from the combustion chamber 12, which means that the mass flux thus added artificially helps to reduce the phenomenon of spontaneous separation. Once full thrust has been established, the nitrogen jet no longer penetrates into the body of the nozzle and it no longer has an influence on the operation of the engine. The stabilizing device is a ground-based device which is generally arranged downstream of the exit 8 of the nozzle and which requires no modification of the engine or of the launcher. It is apt to be used with nozzles which do or do not exhibit an injection device as represented in FIG. 1.

The invention is not limited to the exemplary embodiments described. In particular, jet separation could be initiated for example onward of a plurality of retractable inserts made of refractory material introduced radially into the wall of the nozzle.

What is claimed is:

1. A method of achieving jet separation of an un-separated flow in a divergent nozzle body of a rocket engine that generates a thrust that is parallel with an axis of the nozzle body, said rocket engine including a combustion chamber, a throat, and said nozzle body positioned downstream of said throat, said method comprising:

positioning a plurality of mutually spaced independent separation triggering elements on an injection cross section of the divergent nozzle body perpendicular to the axis of the nozzle body; and simultaneously injecting fluid through said triggering elements to form jet separation zones wherein the spacing between said triggering elements is sufficient to avoid the merger within said injection cross section of two adjacent jet separation zones, whereby a three-dimensional separation of the flow is obtained.

2. A method as in claim 1, wherein said injection cross section is arranged at a distance D from the throat which is substantially less than a distance of spontaneous separation of the flow at an altitude of the rocket engine during said injection.

3. The method of claim 1, wherein in said positioning step, said plurality of mutually spaced separation triggering elements consists of three mutually spaced separation triggering elements.

4. The method of claim 1, wherein in said positioning step, said plurality of mutually spaced separation triggering elements comprises at least three mutually spaced separation triggering elements.

5. The method of claim 1, wherein the positioning step comprises:

uniformly positioning injection orifices for injecting fluid through a wall of the nozzle body over the perimeter of the wall of the nozzle body; and each of the injection orifices inducing a distinct zone of jet separation.

6. The method of claim 1, further comprising:

arranging said injection cross section at distance D from the throat, which is substantially less than a distance D0 of a location of spontaneous separation of the flow at sea level.

7. The method of claim 1, said simultaneously injecting comprising:

situating a plurality of injectors at different distances from the throat;

simultaneously injecting said fluid;

selectively feeding said injectors at different cross sectional locations to take into account the variation of said distance of spontaneous separation of the flow as a function of altitude.

* * * * *